United States Patent
Llorca et al.

(10) Patent No.: US 7,417,546 B2
(45) Date of Patent: Aug. 26, 2008

(54) METHOD AND RFID SYSTEM FOR PROVIDING A SERVICE

(75) Inventors: Pascal Llorca, Le Puy Sainte Réparade (FR); Rob Vandervecht, Aix en Provence (FR)

(73) Assignee: Cognos Incorporated, Ottawa, Ontario (CA)

( * ) Notice: Subject to any disclaimer, the term of this patent is extended or adjusted under 35 U.S.C. 154(b) by 92 days.

(21) Appl. No.: 11/298,834

(22) Filed: Dec. 12, 2005

(65) Prior Publication Data

US 2007/0132585 A1    Jun. 14, 2007

(51) Int. Cl.
*G08B 13/14* (2006.01)
(52) U.S. Cl. .................... 340/572.1; 340/572.4
(58) Field of Classification Search ............ 340/572.1, 340/572.4, 572.8, 572.9, 568.1, 5.42, 5.62, 340/10.1; 235/375, 380, 384; 455/419
See application file for complete search history.

(56) References Cited

U.S. PATENT DOCUMENTS

| | | | | |
|---|---|---|---|---|
| 6,856,968 B2 * | 2/2005 | Cooley et al. | ............ | 705/28 |
| 6,952,772 B2 * | 10/2005 | Deo et al. | ............ | 713/170 |
| 7,031,946 B1 * | 4/2006 | Tamai et al. | ............ | 705/67 |
| 7,058,585 B1 * | 6/2006 | Wood et al. | ............ | 705/4 |
| 7,173,515 B2 * | 2/2007 | Ohki et al. | ............ | 340/5.61 |
| 7,224,277 B2 * | 5/2007 | Kunito et al. | ............ | 340/572.1 |

* cited by examiner

*Primary Examiner*—Van T. Trieu
(74) *Attorney, Agent, or Firm*—Finnegan, Henderson, Farabow, Garrett & Dunner, L.L.P.

(57) ABSTRACT

A method and RFID system for providing a service is provided. A plurality of RFID tokens are prepared. Each tag is associated with one or more services. The RFID token is a RFID tag-based token. A user selects the RFID tag to an item. The RFID token is inserted into a package with the item to request the service to the item. A recipient scans the package to obtain the service information from the RFID tag, and handles the item based on the information.

18 Claims, 6 Drawing Sheets

METHOD AND RFID SYSTEM FOR PROVIDING A SERVICE

FIELD OF INVENTION

The present invention relates to Radio Frequency Identification (RFID) technology, and more particularly to a method and RFID system for providing a service.

BACKGROUND OF THE INVENTION

RFID technologies are well known in the art. There is renewed interest in this technology in recent years as the benefits of wireless technology become more apparent and technological advances have made RFID more accessible. In particular, RFID technologies allow an automatic system and method for asset tracking. It is the usefulness of RFID technology in asset tracking that has fostered the most interest as companies look to more efficient means for tracking incoming and outgoing materials.

RFID systems have therefore been typically used by a supplier and associated with the physical items that are supplied. RFID systems have generally not been developed for the provision of services for these items.

Therefore, there is a desire to provide an RFID system and a method of use that is useful for the provision of a service.

SUMMARY OF THE INVENTION

The present invention relates to the use of RFID systems for the provision of services.

It is an object of the invention to provide a means for providing a service that is associated with an RFID tag.

According to an aspect of the present invention, there is provided an RFID system which includes: a tag manager for providing one or more than one RFID tags, each being associated with a service, the RFID tag being selectively associated with an item; and a service manager for sensing the RFID tag associated with the item and identifying a service associated with the RFID tag.

According to a further aspect of the present invention, there is provided a method of using an RFID tag containing information related to a service, which includes the steps of: having one or more RFID tags, the RFID tag having a memory containing information related to a service; selecting the RFID tag; and associating the RFID tag with an item wherein the service is to be provided to the item.

According to a further aspect of the present invention, there is provided a method of using an RFID tag containing information related to a service, which includes the steps of: scanning for an RFID tag that is associated with an item; detecting the RFID tag; reading the RFID tag to determine the service associated therewith; and handling the item with consideration to the service.

This summary of the invention does not necessarily describe all features of the invention.

BRIEF DESCRIPTION OF THE DRAWINGS

These and other features of the invention will become more apparent from the following description in which reference is made to the appended drawings wherein.

DETAILED DESCRIPTION

Embodiments of the invention provide a system and method for identifying information related to a service that is to be to an item with which a tag is associated.

Figure 1A:
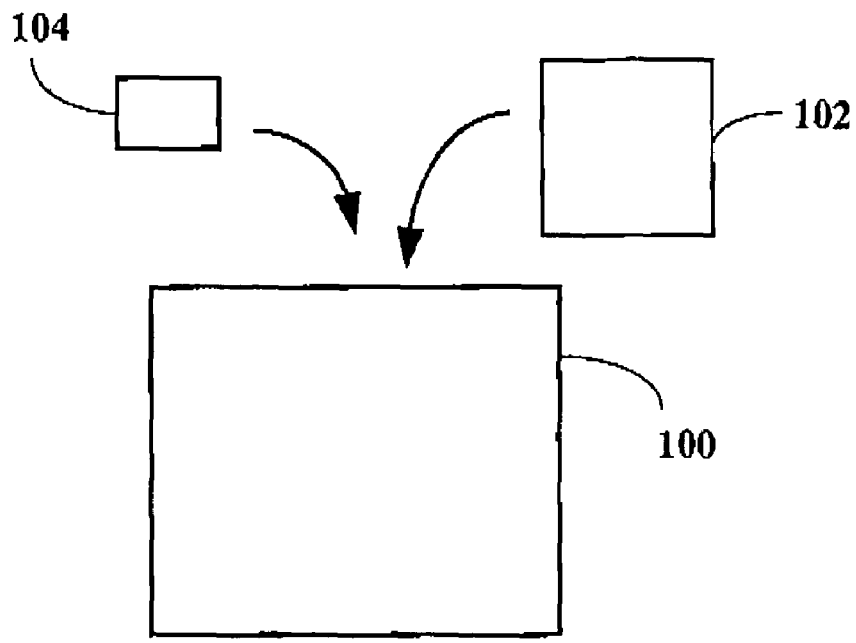
FIG. 1a is a schematic block diagram showing a scenario in which an RFID tag in accordance with the embodiment of the present invention is suitably used.
Figure 1B:
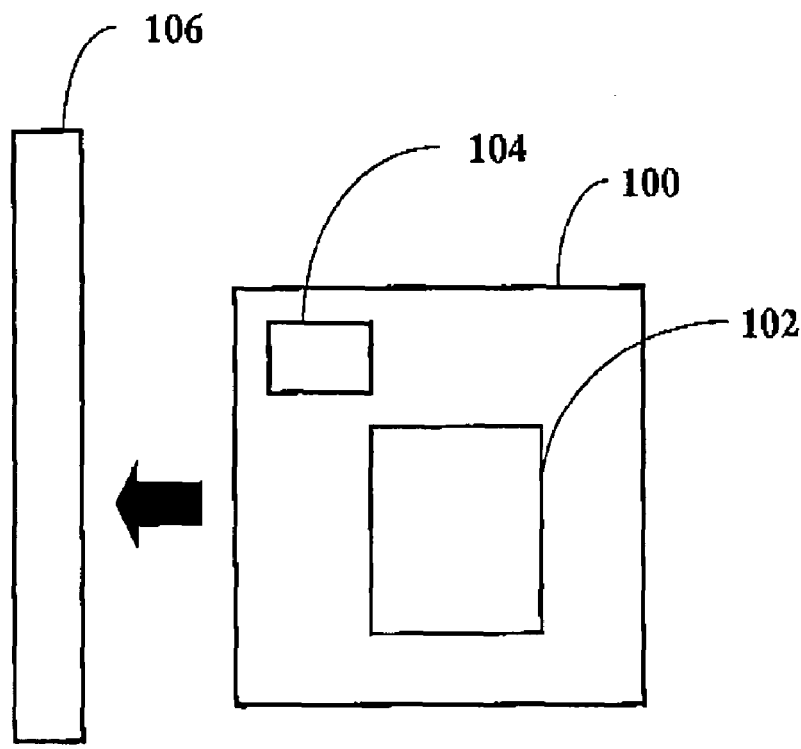
FIG. 1b is a schematic block diagram showing a scenario in which the RFID tag of FIG. 1a is read.

FIGS. 1a and 1b illustrate an exemplary scenario in which an RFID token 104 in accordance with an embodiment of the present invention is suitably used. The RFID token 104 is, along with item 102, inserted into package 100. The RFID token may alternatively be affixed to the item 102 or the package 100. The invention encompasses all means whereby the token 104 is associated with the item 102. Further in the current embodiment a single token is inserted into the package 100. The invention considers the case where a user places at least one token 104 in the package 100. The token 104 is associated with and appropriate for indicating a service that is to be provided to the item 102.

The package 100 may be a shipping package that is used for shipping, handling or storing the item 102. The package 100 may be a container, parcel, envelope, box, or any other structure that is appropriate for receiving the item 102. The package 100 may be a paper or plastic based package that may be in the form of a carton. The package 100 may be made from any material and any configuration that does not interfere with the operation of an RFID token 104 that is located therein. The item 102 may be any item that is to be packaged within the package 100.

The RFID token 104 is in the form of an RFID tag and will hereinafter be referred to as RFID tag 104. The RFID tag 104 may be a read only tag, or a read/write tag. The RFID tag 104 may be a passive or active tag. The RFID tag 104 may have any shape, such as square, trapezoidal, circular, oval, and the like. It may include a signal-processing unit, a communication unit that includes an antenna appropriate for radio frequency communications, and a memory. In an embodiment of the present invention, information identifying and generally associated with one or more specific services is encoded in the RFID tag 104. This information is encoded or stored within the memory of the tag 104. The specific service is, for example, identification of priority handling for the item 102, a pre-paid repair service for the item 102 or priority shipment service for the item 102. The identified priority may be any classification that is associated with the service or services with which the tag 104 is associated. In the current embodiment the priority indicates the turn-around time for a service that is to be provided to item 102. The invention is not to be limited to the above services. Rather any service that may be provided to the item 102 is encompassed by the invention.

In FIG. 1b the package 100 is provided to a service provider. The package 100 with the item 102 and the RFID tag 104 located therein, is passed through an RFID interrogator 106 such that the tag 104 is read by the interrogator 106. In the current embodiment, the RFID interrogator 106 is a portal reader. The portal reader 106 interrogates the RFID tag 104 and obtains information related to a service associated with the RFID tag 104 that is encoded therein, when the package 100 enters the facility. This information related to the service can be collected without opening the package 100. For example, the package 100 may be one package amongst a plurality of packages that are located on a truck wherein the truck passes through the portal reader 106. Thus the packages can be processed according to the service indicated by tags located therein without having to open the packages, review paperwork and input information into a database. In the current embodiment the service provider offers and provides services without a customer contract. The user simply purchases one or more RFID tags 104, and selectively uses them.

It is noted that the RFID interrogator 106 is not limited to a portal reader, and may be any reader or sensor that can communicate with and read information from the RFID tag 104. The RFID interrogator 106 may communicate with a computer system or the service provider (e.g. the computer system 214 of FIG. 2a or the computer system 222 of FIG. 2b) through a wired/wireless communications network, which may process information obtained through the RFID interrogator 106.

With consideration to the basic system and method described above there are numerous options related to the service with which the tag is associated, the nature of the information identifying this information located on the RFID tag 104 and the nature in which this information is handled prior to and after use of the tag.

Figure 2A:
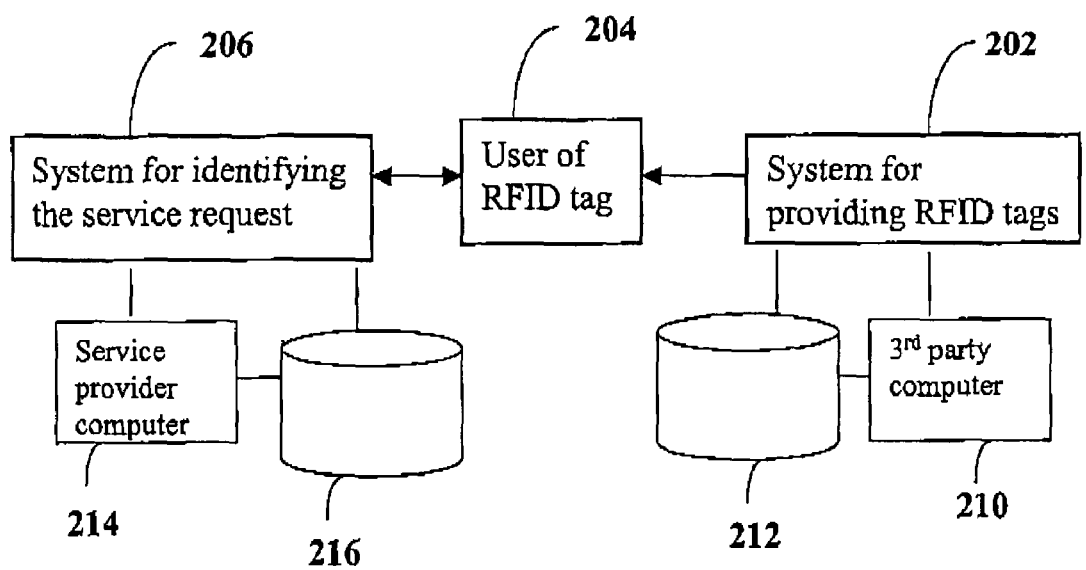
FIG. 2a is a schematic block diagram showing one example of an RFID system for providing a service according to an embodiment of the invention.

The current embodiment of the invention considers systems and methods for distributing and managing tags. Two examples of systems for providing services through the use of an RFID tag are presented in FIGS. 2a and 2b. In FIG. 2a the RFID system 200a includes a tag manager 202, a user 204 and a service manager 206. The tag manager 202 distributes and/or provides at least one RFID tag 104, each of the tags 104 has specific service information encoded thereon. The user 204 purchases the RFID tag 104 from the tag manager 202 and selects or selectively uses a particular RFID tag 104 to request a service with respect to the item 102. The service manager 206 is the service provider. The service manager 206 reads or interrogates the RFID tag 104 and provides the service to the user 204. In the current example the tag manager 202 and the service manager 206 are separate entities. Further the tag manager 202 is a $3^{rd}$ party with respect to the user 204 and the service manager 206.

The tag manager 202 may include a computer system 210 and a database 212 for managing the RFID tags 104, or the RFID tags 104 and services associated therewith. The service manager 206 may include a computer system 214 for determining a service based on information read from the RFID tag 104 and for managing services, or the services and the RFID tags 104 associated therewith, and a database 216 for managing the information read from the RFID tag 104 and managing the services. The computer system 210 may be connected to the computer system 214 through a communications network.

The user 204 may insert the item 102 and the selected RFID tag 104 into the package 100, and may send the package 100 to the service manager 206. The tag 104 is obtained from the tag manager 202. The service manager 206, receives the package 100 with the item 102 and the RFID tag 104. The service manager 206 senses/reads/scans the tag 104 receiving the service information and identifies a service that is to be provided to the item 102. The service manager 206 handles the item 102 based on the service information. In this embodiment the tag manager 202 and the service manager 206 are elements of different entities.

Figure 2B:
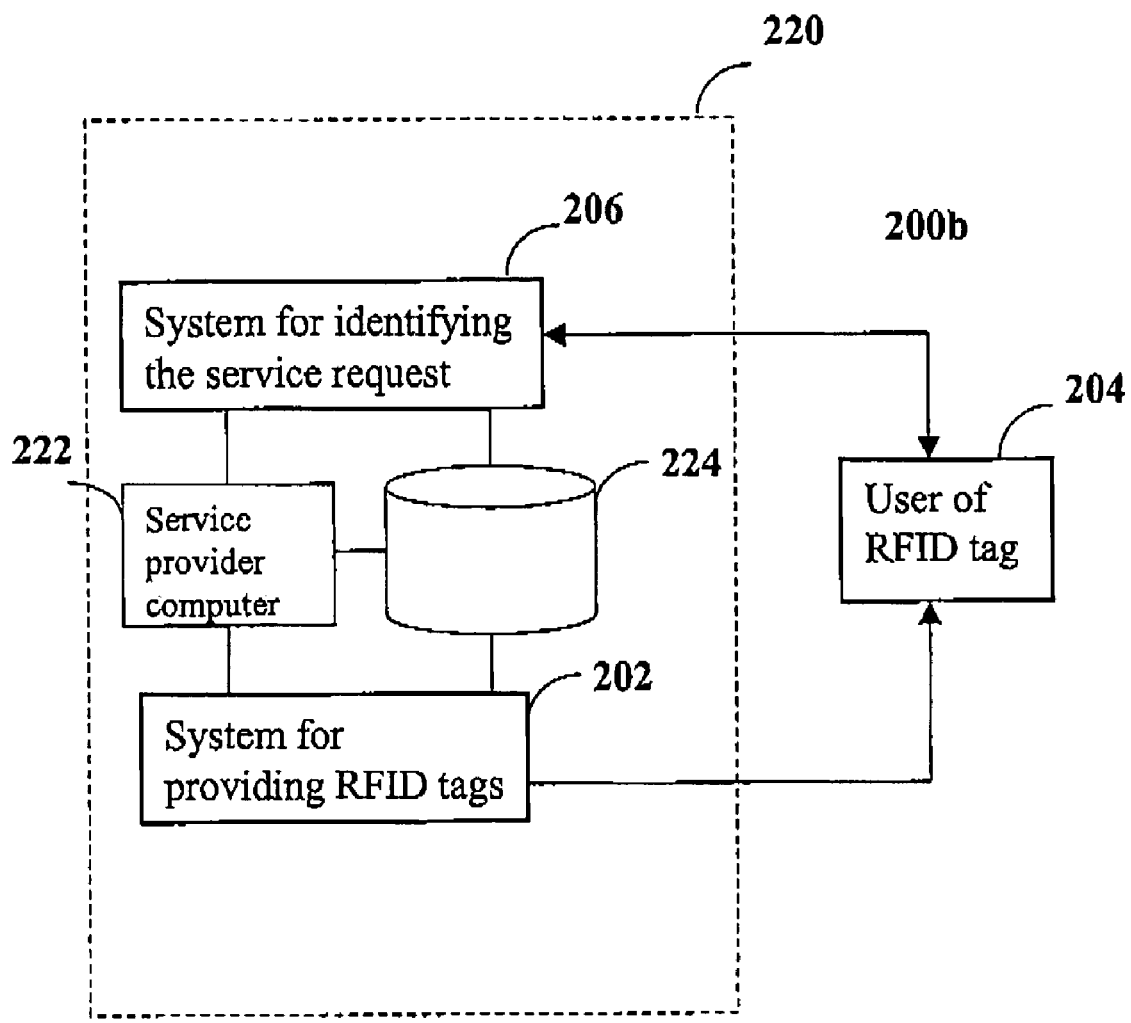
FIG. 2b is a schematic block diagram showing another example of an RFID system for providing a service according to an embodiment of the invention.

FIG. 2b illustrates another example of an RFID system for providing a specific service using an RFID tag. The RFID system 200b of FIG. 2b includes a manger 220 having the tag manager 202 and the service manager 206 included therein. The manager 220 may also contain a computer system 222 and a database 224, which are shared by the tag manager 202 and the service manager 206. In this example the tag manager 202 and the service manager 206 are elements of the same entity, namely manager 220.

Referring to FIGS. 2a and 2b, the database, i.e., 212, 216, 224, may be created and managed by the manager with which they are associated to track, monitor and verify the services associated with the RFID tags 104. For example, with reference to FIG. 2b, when the RFID tags 104 are offered for sale, their identification information and internal data is stored in the database 224. When the RFID tags 104 are sensed/read/scanned at the time of their use their information is validated and confirmed against the information stored in the database 224 to verify the service to be provided. In some cases, identification numbers or codes imbedded in the RFID tags 104 are cross-referenced in the database 224 to identify the correct service to be provided.

Through the use of the RFID tag 104, the information in the database 212, 216, 224 may be updated when the RFID tag 104 is scanned. In this scenario, the information on the RFID tag 104 may update and or override information that is currently in the database.

In an example, a technician (e.g., the user 204 of FIGS. 2a and 2b) would like to have the item 102 repaired within 24 hours. The technician selects the RFID tag 104 indicating the level of service (i.e., repair within 24 hours). The RFID tag 104 is inserted in the package 100 with the item 102. The package 100 is forwarded to the manufacturer or other provider of the required repair service (e.g., the service manager 206 of FIGS. 2a and 2b). At a facility where the package 100 is received, the level of service to be provided to item 102 within package 100 is automatically detected, and the package 100 is prioritized according to this level of service.

In an embodiment of the invention, the RFID tag 104 has information stored therein that indicates a service and a price associated with the service. In the embodiment, a user purchases one or more RFID tags 104 where the price of the RFID tag 104 includes the price of the service with which the RFID tag 104 is associated. Thus the cost of the service is prepaid. Further, according to this embodiment, the user does not need to sign a contract, such as a maintenance contract, for obtaining a service with respect to the item 102. In an embodiment of the invention such a contract may be provided with the memory of the RFID tag 104.

Figure 3:
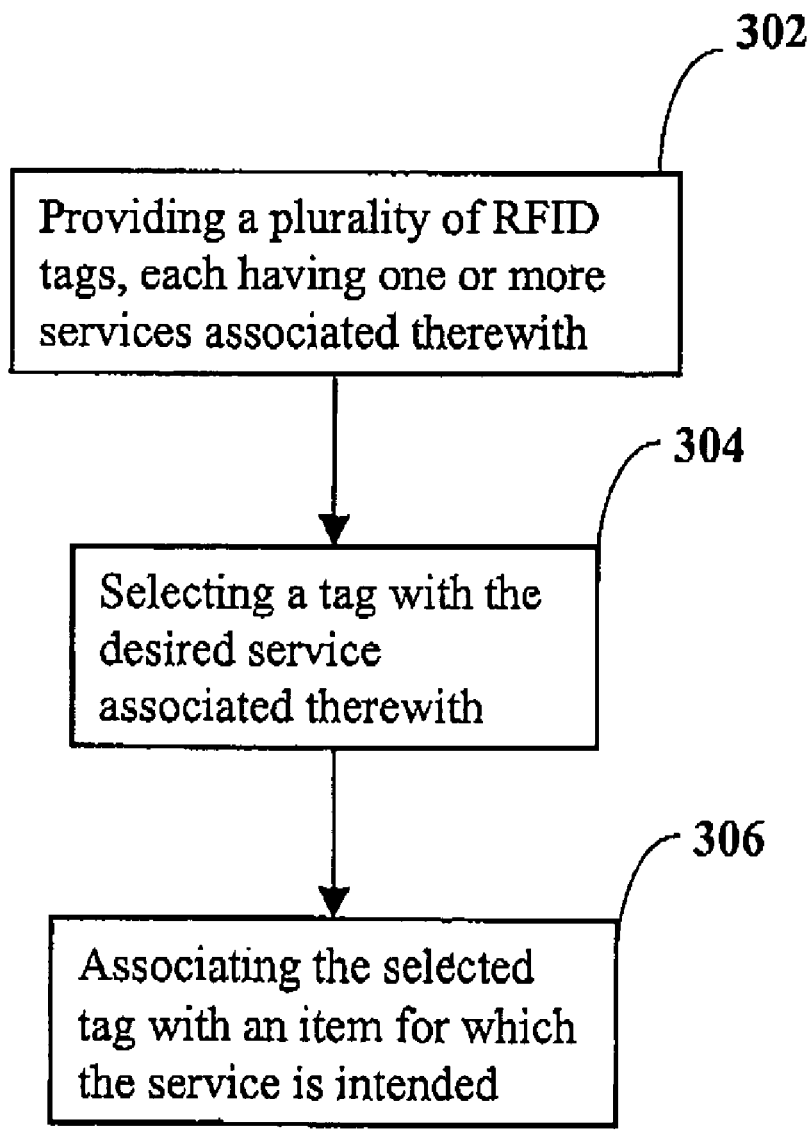
FIG. 3 is a flow chart showing an exemplary method of associating a service with an item according to an embodiment of the invention.

FIG. 3 is a flow chart showing an exemplary method of associating a service with an item 102. One RFID tag 104 is, for example, associated with a service "repair within 24 hours", and another tag 104 is associated with a service "repair within 3 days".

At step 302, a plurality of RFID tags 104 are provided. At step 304, at least one RFID tag 104 associated with the desired service, such as "repair within 24 hours", is selected.

At step 306, the selected RFID tag 104 is associated with the item 102. For example, as described above, the selected RFID tag 104 is associated with the item by inserting the item 102 and the selected RFID tag 104 into the package 100.

Figure 4:
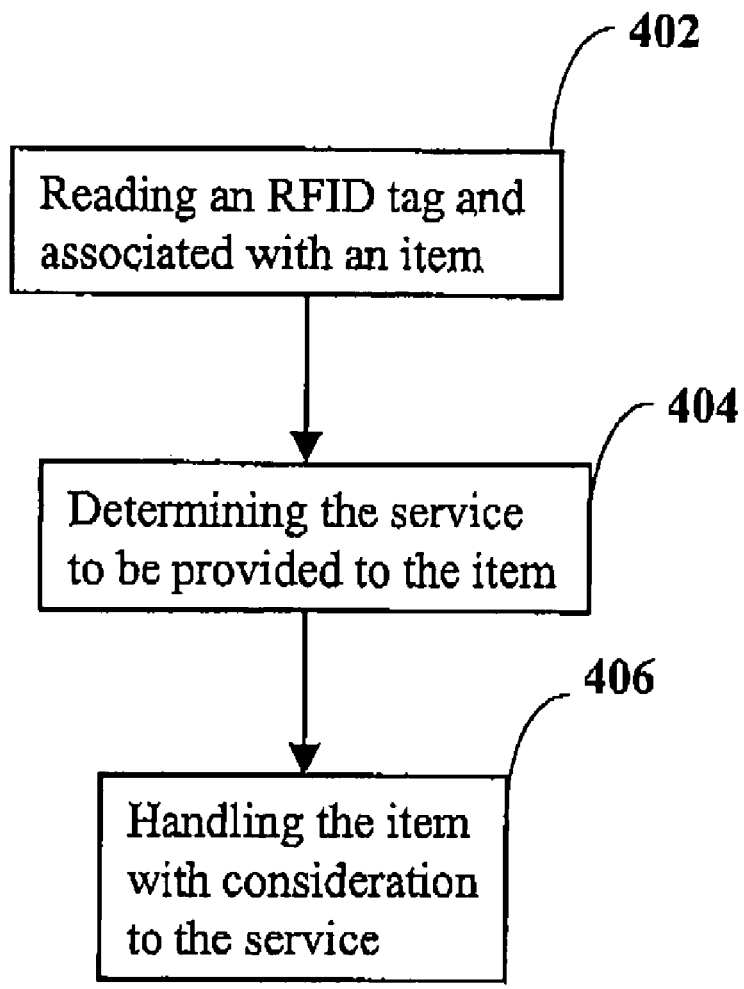
FIG. 4 is a flow chart showing an exemplary method of providing at least one service according to an embodiment of the invention.

FIG. 4 is a flow chart showing an exemplary operation for providing at least one service. It is assumed that the RFID tag 104 is associated with an item 102 as per the method presented FIG. 3.

At step 402, an RFID reader, such as the RFID interrogator 106 of FIG. 1b, reads the RFID tag 104 associated with the item 102.

At step 404, based on the read information, the service that is to be provided to the item 102 is determined. At step 406, based on the determination, the item 102 is handled with consideration to the service.

The item 102 may be handled based on information programmed in the RFID tag and information stored in, for example, the database 212, 216 of FIG. 2a, 224 of FIG. 2b.

In a further embodiment of the present invention, the expiration date of a service associated with the RFID tag 104 is tracked. The expiration date may be encoded directly on the tag 104 or the tag 104 may contain be encoded with an identifier that allows access to this information, which is contained in the database 212, 216 or 224.

In a further embodiment of the present invention, the RFID tag 104 may be associated with a service and a specific item that may receive that service. In this case, particular pricing information related to the service may be provided on the RFID tag 104 or as above within a database that is identified by the tag 104. The tag 104 or the associated file in the database can indicate how much was paid for the token, thereby indicating what services are included, for example, a fast turn around time for identified specific services. The tag 104 or database could indicate a "maximum" or "not to exceed" amount that is established by the service provider. Further, the tag 104 or database could theoretically carry a running balance of the clients' account. In this scenario service fees could be subtracted from the tag 104 after each service. The available balance could also be increased by purchasing more services or credit. The purchased credit would then be updated onto the tag 104.

As described above, the RFID tag 104 may be a read/write tag. Information in addition to that discussed above may be written on the RFID tag 104 by the user to supplement that already associated with the RFID tag 104. The additional information may include specialized instructions; order information or product configuration details. The order information may include customer information, Purchase Order (PO) numbers and the like. The product configuration details may include, for a computer system, the amount of memory contained therein, the operating system and the identification of any peripherals added thereto. The tag manager 202 may write additional information, such as order information, product configuration details, to the RFID tag 104.

The user 204 (or customer), who is using the RFID tag 104, may write additional instructions on the RFID tag 104. The instructions written on the RFID tag 104 are automatically associated with the item 102.

Figure 5:
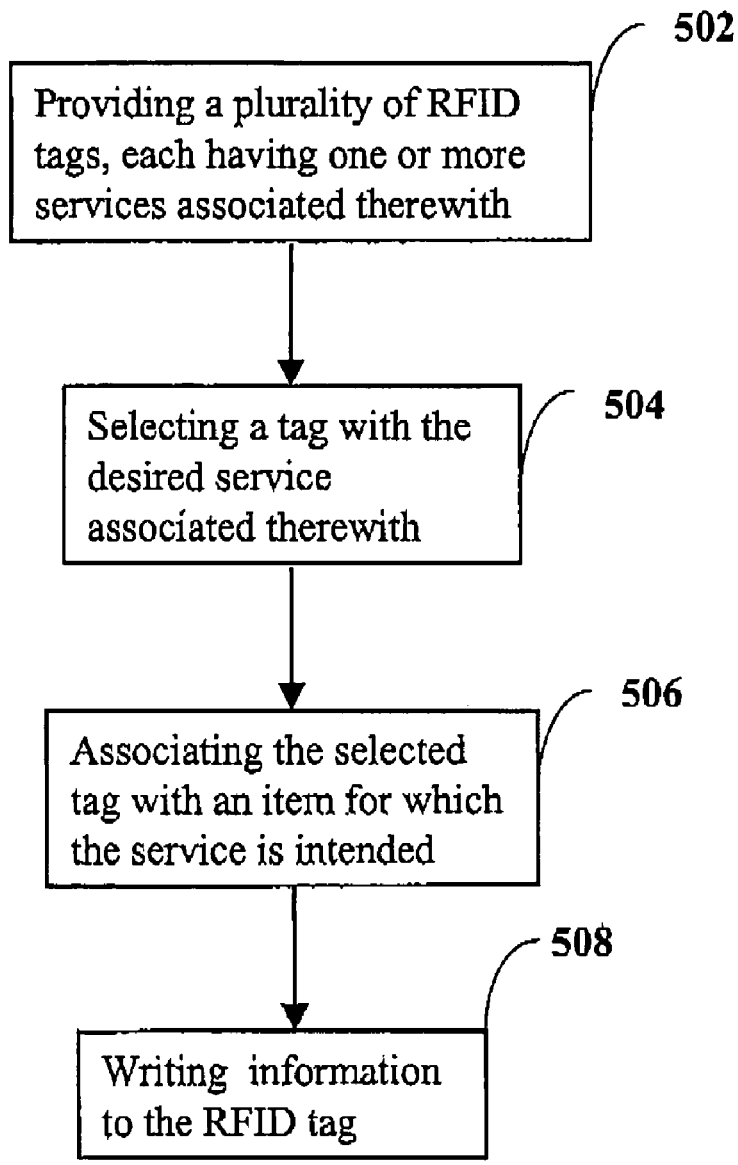
FIG. 5 is a flow chart showing an exemplary method of writing information to an RFID tag according to an embodiment of the invention.

FIG. 5 is a flow chart showing an exemplary method of writing additional information to the RFID tag 104 by a user (e.g. the user 204 of FIGS. 2a and 2b). Steps 502-506 of FIG. 5 are similar to steps 302-306 of FIG. 3. At step 508 the user writes information to the RFID tag 104. The positioning of step 508 is somewhat arbitrary with the additional information be written to the tag generally before or after step 506. By writing information after step 506 the information is written to the tag 104 after the tag 104 has been associated with the item 102, ensuring the information is associated with the correct item.

According to embodiments of the present invention, the RFID tag 104 becomes the physical embodiment of a service. The RFID tag 104 is the "currency" or "product" that is bought and sold in commercial transactions. The RFID system allows for the association of a prepaid service with an item. This greatly reduces the need for paper work including the generation of purchase orders.

The present invention has been described with regard to one or more embodiments. However, it will be apparent to persons skilled in the art that a number of variations and modifications can be made without departing from the scope of the invention as defined in the claims.

What is claimed is:

1. An RFID system comprising:
a tag manager for providing one or more RFID tags having one or more services, prior to associating the one or more RFID tags to an item; at least one service being selectively associated with the item by selecting at least one of the one or more RFID tags for the item; and
a service manager for sensing the at least one of the one or more RFID tags to provide the at least one service to the item, wherein the service of the sensed RFID tag is provided to the item.

2. An RFID system according to claim 1, further comprising a database having information related to the tag, the service or a combination thereof stored therein.

3. An RFID system according to claim 2, wherein the database is utilized for tracking an expiration date of the service.

4. An RFID system according to claim 2, wherein each of the one or more RFID tags has information including a unique identification and the service associated therewith, and wherein the information of each of the one or more RFID tags is stored in the database.

5. An RFID system according to claim 4, wherein the service manager validates and confirms the identification against the database to verify the service to be provided.

6. An RFID system according to claim 1, wherein the RFID tag is a prepaid token having the service and a price of the service associated therewith.

7. An RFID system according to claim 1, wherein the RFID tag has information on the service having priority information, and wherein the service manager provides the service in response to the priority associated with the sensed priority information.

8. An RFID system according to claim 1, further comprising a module for writing additional information to the RFID tag.

9. An RFID system according to claim 8, wherein a user selectively using the RFID tag writes one or more instructions associated with the service to the RFID tag.

10. An RFID system according to claim 8, wherein the tag manager writes additional information when a user selects the RFID tag with respect to the item.

11. An RFID system according to claim 1, wherein the RFID tag comprises:
a processing unit;
an antenna appropriate for radio frequency communications with the RFID tag; and
a memory containing information related to a service.

12. An RFID system according to claim 1, wherein the service manager includes an RFID interrogator, which is capable of communicating with the RFID tag.

13. An RFID system according to claim 12, wherein the RFID tag is inserted into a package with the item, and at the service manager, the information stored in the RFID tag is read through the RFID interrogator without opening the package.

14. A method of using an RFID tag containing information related to a service;
- providing one or more RFID tags having one or more services, prior to associating the one or more RFID tags to an item,
- selecting at least one of the one or more RFID tags for the item; and
- associating the selected RFID tag with the item wherein at least one service of the at least one RFID tag is to be provided to the item.

15. A method according to claim 14, further comprising the step of:
- writing additional information to the RFID tag.

16. A method of using an RFID tag containing information related to a service;
- providing one or more RFID tags having one or more services, prior to associating the one or more RFID tags to an item;
- selecting at least one of the one or more RFID tags for the item;
- reading the at least one of the one or more RFID tags, including identifying at lease one service of the at least one of the one or more RFID tags for the item; and
- handling the item with consideration to the at least one service.

17. A method according to claim 16, wherein the reading step includes scanning a package containing the item and the at least one of the one or more RFID tags, and reading the at least one of the one or more RFID tags without opening the package.

18. A method according to claim 16, further comprising tracking the expiration date of the service with the RFID tag.

* * * * *

UNITED STATES PATENT AND TRADEMARK OFFICE
CERTIFICATE OF CORRECTION

PATENT NO. : 7,417,546 B2  Page 1 of 1
APPLICATION NO. : 11/298834
DATED : August 26, 2008
INVENTOR(S) : Pascal Llorca and Rob Vandervecht It is certified that error appears in the above-identified patent and that said Letters Patent is hereby corrected as shown below:

On the title page, item [73] should read:

Name of Assignee:

Psion Teklogix Inc.    Ontario, Canada

Signed and Sealed this

Seventeenth Day of February, 2009

JOHN DOLL
*Acting Director of the United States Patent and Trademark Office*